US007481983B2

(12) United States Patent
Patchett et al.

(10) Patent No.: US 7,481,983 B2
(45) Date of Patent: Jan. 27, 2009

(54) ZONE COATED CATALYST TO SIMULTANEOUSLY REDUCE $NO_X$ AND UNREACTED AMMONIA

(75) Inventors: Joseph Allan Patchett, Basking Ridge, NJ (US); Joseph Charles Dettling, Howell, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 808 days.

(21) Appl. No.: 10/925,018

(22) Filed: Aug. 23, 2004

(65) Prior Publication Data

US 2006/0039843 A1    Feb. 23, 2006

(51) Int. Cl.
B01D 50/00    (2006.01)
(52) U.S. Cl. .................. 422/180; 422/177
(58) Field of Classification Search .......... 422/168, 422/177, 180; 423/213.5; 427/230, 238; 60/286, 295, 301
See application file for complete search history.

(56) References Cited

U.S. PATENT DOCUMENTS

| | | | |
|---|---|---|---|
| 3,111,396 A | 11/1963 | Ball | |
| 3,970,739 A | 7/1976 | Shiraishi et al. | 423/23 S |
| 4,003,978 A | 1/1977 | Shiraishi et al. | 423/237 |
| 4,138,469 A | 2/1979 | Kato et al. | 423/239 |
| 4,188,364 A | 2/1980 | Gladden | 423/213.2 |
| 4,233,185 A | 11/1980 | Knapton et al. | 252/462 |
| 4,389,382 A | 6/1983 | Gandhi et al. | 423/213.5 |
| 4,438,082 A | 3/1984 | Dettling et al. | 423/235 |
| 4,883,113 A | 11/1989 | Matsui et al. | 164/428 |
| 4,961,917 A | 10/1990 | Byrne | 423/239 |
| 4,963,332 A | 10/1990 | Brand et al. | 423/235 |
| 5,024,981 A | 6/1991 | Speronello et al. | 502/67 |
| 5,120,695 A | 6/1992 | Blumrich et al. | 502/78 |

(Continued)

FOREIGN PATENT DOCUMENTS

EP    0 730 900 A1    9/1996

(Continued)

OTHER PUBLICATIONS

Pending U.S. Appl. No. 10/634,659, filed Aug. 5, 2003, Patchett, et al.

(Continued)

*Primary Examiner*—Tom Duong
(74) *Attorney, Agent, or Firm*—Melanie L. Brown; Drinker Biddle & Reath; Bronwen M. Loeb

(57) ABSTRACT

Provided is an emissions treatment system and method for reducing $NO_x$ emissions in the exhaust stream produced from an internal combustion engine. The system has an injector for periodically metering ammonia or an ammonia precursor into an exhaust stream; and a first substrate with a first SCR catalyst composition, downstream of the injector. The first substrate has an inlet end, an outlet end, a length extending between the inlet end to the outlet end, and wall elements. The first SCR catalyst composition is disposed on the wall elements from the inlet end toward the outlet end to form an inlet zone. The first substrate also has an $NH_3$ destruction catalyst composition with a platinum group metal component dispersed on a refractory metal oxide. The $NH_3$ destruction catalyst is disposed on the wall elements from the outlet end to form an outlet zone.

29 Claims, 10 Drawing Sheets

U.S. PATENT DOCUMENTS

| | | | |
|---|---|---|---|
| 5,124,303 A | 6/1992 | Kobayashi et al. | 502/241 |
| 5,354,544 A | 10/1994 | Logan et al. | 423/213.7 |
| 5,399,324 A | 3/1995 | Subramanian et al. | 423/213.7 |
| 5,462,907 A | 10/1995 | Farrauto et al. | 502/304 |
| 5,491,120 A | 2/1996 | Voss et al. | 502/304 |
| 5,516,497 A | 5/1996 | Speronello et al. | 423/235 |
| 5,522,218 A | 6/1996 | Lane et al. | 60/274 |
| 5,587,134 A | 12/1996 | Dannevang | 423/237 |
| 5,679,313 A | 10/1997 | Nojima et al. | 423/237 |
| 5,728,356 A | 3/1998 | Iida et al. | 423/239.1 |
| 5,968,861 A * | 10/1999 | Feeley et al. | 502/74 |
| 6,077,600 A | 6/2000 | Atmur et al. | 428/293.4 |
| 6,080,376 A | 6/2000 | Iida et al. | 423/239.1 |
| 6,274,107 B1 * | 8/2001 | Yavuz et al. | 423/213.5 |
| 6,415,602 B1 | 7/2002 | Patchett et al. | 60/286 |
| 2001/0026838 A1 * | 10/2001 | Dettling et al. | 427/230 |
| 2004/0001781 A1 | 1/2004 | Kumar et al. | 422/180 |
| 2004/0001782 A1 | 1/2004 | Kumar et al. | 422/180 |
| 2004/0098980 A1 * | 5/2004 | Montreuil et al. | 60/295 |

FOREIGN PATENT DOCUMENTS

| | | |
|---|---|---|
| WO | WO 9939809 A1 * | 8/1999 |
| WO | WO 99/55459 | 11/1999 |
| WO | WO 02/100520 A1 | 12/2002 |

OTHER PUBLICATIONS

J.J. Biermann, et al., Molybdena on Silica Catalysts: Selective Catalytic Oxidation of Ammonia to Nitrogen Over $MoO_3$ on $SiO_2$ Catalysts, Elsevier Sequoia The Netherlands, Journal of Molecular Catalysis, 60 (1990) 229-238.

A. Wöllner, et al., Characterization of Mixed Copper-Manganese Oxides Supported on Titania Catalysts for Selective Oxidation of Ammonia, Elsevier Science Publishers BV Amsterdam, Applied Catalysis A: General, 94 (1993) 181-203.

M. De Boer, et al., Selective Oxidation of Ammonia to Nitrogen Over $SiO_2$-Supported $MoO_3$ Catalysts, Elsevier Science Publishers BV Amsterdam, Catalysis Today, 17 (1993) 189-200.

N.N. Sazonova, et al., Selective Catalytic Oxidation of Ammonia to Nitrogen, Elsevier Science BV Amsterdam, React. Kinet. Catal. Lett. vol. 57, No. 1, 71-79 (1996).

Marcella Trombetta, et al., Ammonia Adsorption and Oxidation on Cu/Mg/Al Mixed Oxide Catalysts Prepared via Hydrotalcite-type Precursors, 1997 American Chemical Society, *Langmuir* 1997, 13, 4628-4637.

Yuejin Li, et al., Selective $NH_3$ Oxidation to $N_2$ in a Wet Stream, 1997 Elsevier Science BV, Applied Catalysis B: Environmental 13 (1997) 131-139.

Lu Gang, et al., $NH_3$ Oxidation to Nitrogen and Water at Low Temperatures Using Supported Transition Metal Catalysts, 2000 Elsevier Science BV, Catalysis Today 61 (2000) 179-185.

L. Lietti, et al., Characterization and Reactivity of $MoO_3/SiO_2$ Catalysts in the Selective Catalytic Oxidation of Ammonia to $N_2$, 2000 Elsevier Science BV, Catalysis Today 61 (2000) 187-195.

R.Q. Long, et al., Selective Catalytic Oxidation (SCO) of Ammonia to Nitrogen Over Fe-Exchanged Zeolites, 2001 Academic Press, Journal of Catalysis 201, 145-152 (2001).

Wioletta Raróg, et al., Decomposition of Ammonia Over Potassium Promoted Ruthenium Catalyst Supported on Carbon, 2001 Elsevier Science BV, Applied Catalysis A: General 208 (2001) 213-216.

J. Haber, et al., Total Oxidation of Nitrogen-Containing Organic Compounds to $N_2$, $CO_2$ and $H_2O$, 2002 Elsevier Science BV, Applied Catalysis A: General 229 (2002) 23-34.

Jacques Barbier, Jr., Catalytic Wet Air Oxidation of Ammonia Over $M/CeO_2$ Catalysts in the Treatment of Nitrogen-Containing Pollutants, 2002 Elsevier Science BV, Catalysis Today 75 (2002) 29-34.

Lu Gang, et al., Low Temperature Selective Oxidation of Ammonia to Nitrogen on Silver-Based Catalysts, 2003 Elsevier Science BV, Applied Catalysis B: Environmental 40 (2003) 101-110.

* cited by examiner

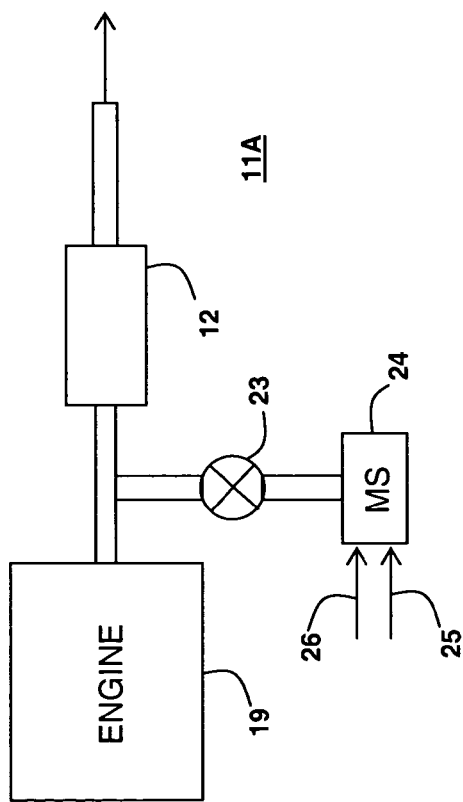
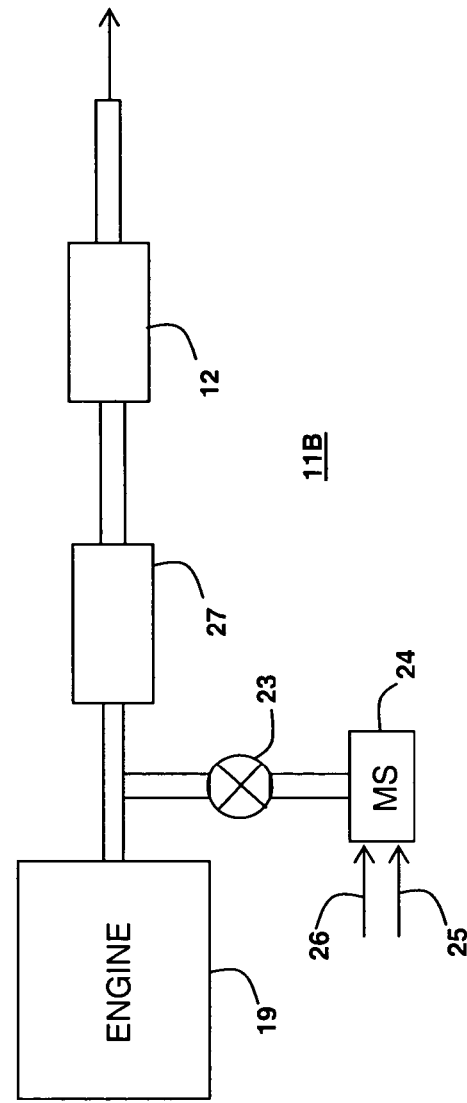

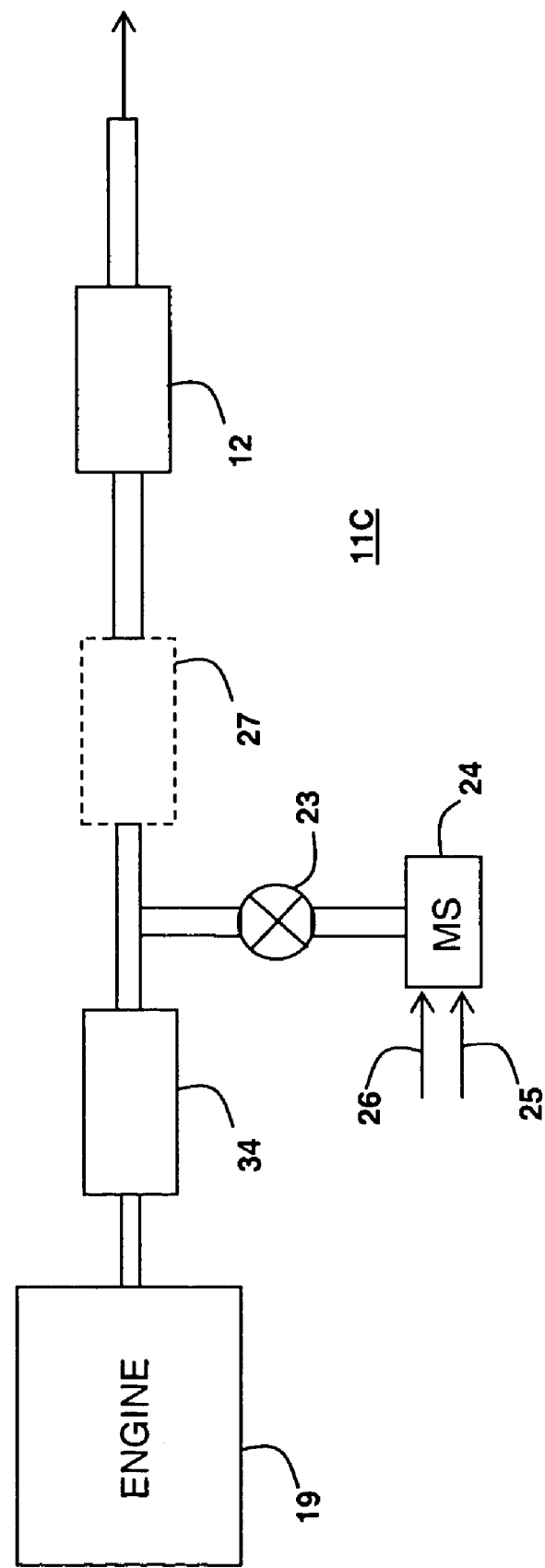

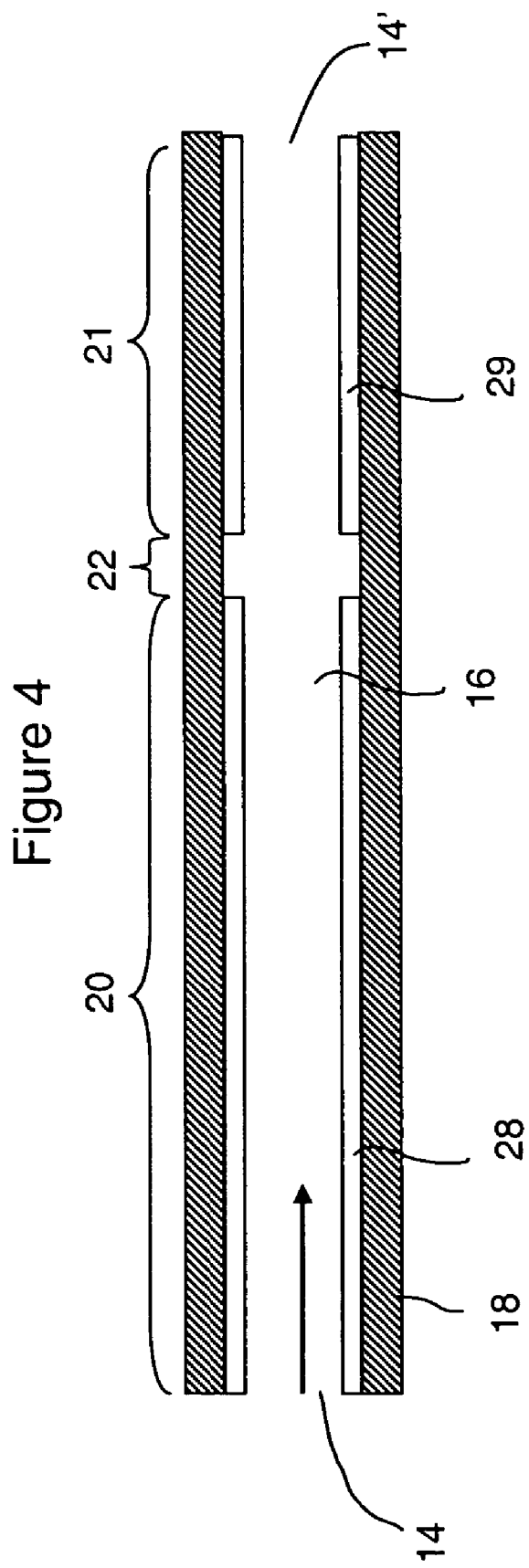

ZONE COATED CATALYST TO SIMULTANEOUSLY REDUCE NO$_X$ AND UNREACTED AMMONIA

The present invention relates to an emissions treatment system and method for reducing nitrogen oxides (NOx) emissions in the exhaust stream produced from an internal combustion engine.

Internal combustion engines that operate at combustion conditions with large excesses of air over that required for stoichiometric combustion, i.e., lean conditions, present particular difficulties in removing NOx from their exhaust gases. For instance, many diesel powered vehicles will require NOx specific abatement strategies to meet future emissions standards adopted throughout the world.

A proven NOx abatement technology applied to stationary sources with lean exhaust conditions is Selective Catalytic Reduction (SCR) using ammonia (NH$_3$) or an NH$_3$ precursor. In processes using this technology, NOx is reduced with ammonia (NH$_3$) to nitrogen (N$_2$) over a catalyst that is typically composed of base metal oxides. The technology is capable of NOx reduction greater than 90%, and thus it represents one of the best approaches for achieving aggressive NOx reduction goals. SCR is under development for mobile applications, with urea (typically present in an aqueous solution) as the source of ammonia. SCR provides efficient conversions of NOx as long as the exhaust temperature is within the active temperature range of the catalyst.

The use of a reductant such as ammonia requires that the ammonia be metered into the exhaust system in quantities proportional to the amount of NOx in the exhaust gas so that adequate NOx treatment is achieved, and so that large excesses of ammonia do not pass unreacted through the exhaust system. Ammonia in the exhaust can contribute to particulates and, in high concentrations, can lead to a distinctive and irritating odor.

Diesel engines operate under transient conditions, that is the engine speed and load vary over a time interval of a few seconds. The amount of NOx in the exhaust stream varies in concert with the changing operating conditions, and accordingly, the amount of the reactant ammonia that is metered into the exhaust must likewise be metered in proportion to the NOx in the exhaust. Theoretically, providing ammonia in excess of the stoichiometric amount required to react completely with the nitrogen oxides present, is favorable for driving the reaction to completion. However, in practice, furnishing the system with significant excess ammonia over such stoichiometric amount is not done because of the liability of discharging unreacted ammonia to the atmosphere.

Such discharge of unreacted ammonia can occur even in cases where ammonia is present only in a stoichiometric or sub-stoichiometric amount, as a result of incomplete reaction and/or poor mixing of the ammonia in the gaseous stream, resulting in the formation therein of channels of high ammonia concentration. Such channeling is of particular concern when utilizing catalysts comprising monolithic honeycomb-type carriers comprising refractory bodies having a plurality of fine, parallel gas flow paths extending therethrough. Unlike the case of beds of particulate catalyst, there is no opportunity for gas mixing between channels.

Provisions are often included in SCR catalyst systems to regulate the dosing of the reductant to account for changes in the engine operating conditions. Yet despite sophisticated dosing controls, the vehicle may operate under conditions that result in excess ammonia passing un-reacted through the SCR catalyst bed as part of the engine exhaust.

Another strategy that can be used in combination with the ammonia dosing controls described above is to include an NH$_3$ destruction catalyst downstream of the SCR catalyst. The staging of the SCR catalyst with a downstream NH$_3$ destruction catalyst provides an emissions treatment system that can oxidize excess ammonia that is not consumed in the SCR reaction to N$_2$. Thus, the system can in principle accommodate injection of amounts of ammonia into the exhaust stream that are greater than the stoichiometric amount needed to treat the NOx, with diminished risk of ammonia discharge into the atmosphere.

The prior art describes staged catalysts that combine an upstream SCR catalyst zone and a downstream NH$_3$ oxidation zone. These references are described below.

U.S. Pat. No. 3,970,739 discloses a process for stripping ammoniacal nitrogens and organic materials, as gases, which are present in process waste waters to be discharged from plants. The gases are used in ammonia synthesis, and are manufactured by reforming hydrocarbon with steam. The process includes decomposing organic materials selectively in the presence of a catalyst at a temperature of about 120 to 400° C., mixing the remaining gases with flue gases that contain NOx, reacting the gaseous mixture over a catalyst at a temperature of about 150 to 700° C., and decomposing the unreacted ammonia, if any, in the presence of a catalyst at a temperature of about 150 to 700 ° C. to render the nocuous substances innocuous.

A staged NOx treatment—NH$_3$ oxidation system is also described for treatment of a combusted gas stream from a hydrocarbon burning engine that contains nitric oxide in U.S. Pat. No. 4,188,364 ("the '364 patent"). The nitric oxide is reacted with ammonia over a first catalyst comprising inorganic oxides and then the excess ammonia is reacted with oxygen over a second catalyst to form a substantially nitric oxide free and ammonia free exhaust stream. Generally, the second catalyst is disclosed to comprise a Group VIII noble metal such as platinum, palladium, ruthenium rhodium, osmium, iridium or the like or mixture thereof included on a porous solid catalyst, generally a porous inorganic oxide carrier such as alumina or the like.

U.S. Pat. No. 4,438,082 ("the '082 patent") discloses, among other things, a two-stage catalyst system having a first stage comprised of V$_2$O$_5$/Al$_2$O$_3$ and a second stage comprised of Pt/Au/Al$_2$O$_3$. The vanadium pentoxide catalyst is said to provide ideal catalytic action between 300 and 550° C., and the platinum gold catalysts are useful in reducing NOx with ammonia with oxygen over the range of from about 225 to 400° C. The platinum gold catalyst is said to be useful for either reducing NOx in gas streams with the temperature range of from about 225 to 400° C., or if the platinum gold catalyst is used following the vanadium pentoxide catalysts, then effective reduction of NOx may be carried out by the system over the range of about 225 to 550° C. In one configuration disclosed in the '082 patent, one end of a single support may be coated with vanadium pentoxide while the other end may be coated with the platinum gold catalyst.

A two zone catalyst system for catalytic reduction of NOx is also disclosed in U.S. Pat. No. 5,024,981 ("the '981 patent"). A first or upstream zone of the system has a zeolite catalyst composition that has as a lower metal (e.g., iron or copper) promoter loading than the metal promoter loading of the second zone or downstream zone, which also comprises a zeolite catalyst composition. The catalyst composition in the first zone is said to favor reduction of nitrogen oxides and the second catalyst is said to favor the oxidation or decomposition of excess ammonia.

U.S. Pat. No. 5,120,695 ("the '695 patent") discloses a one piece catalyst for purifying exhaust gases from internal combustion engines and gas turbines that are operated above the stoichiometric ratio. The one-piece honeycomb ceramic or metallic carrier has a reduction catalyst on its leading edge portion and an oxidation catalyst on its trailing edge portion. Exhaust gases are brought into contact in immediate succession in the single honeycomb-form with catalyst zones called zone 1, for the reduction part, and zone 2, for the oxidation part. The catalyst can be completely in the form of a carrier catalyst or alternatively can be a solid catalyst coated with the oxidation catalyst in zone 2.

Among the reduction catalysts that are disclosed to be useful in the '695 patent are various titanium oxides-containing catalysts and acid resistant zeolite full type catalyst, optionally of mordenite type, containing copper, iron and optionally, cerium or molybdenum. The oxidation catalysts disclosed to be useful for zone 2 include noble metal-containing compositions (e.g., platinum, palladium, and rhodium).

A number of the above-described staged emissions treatment system use $NH_3$ destruction catalyst compositions that include platinum group metal components. This similarity can no doubt be reconciled with the recognized advantages of incorporating platinum group metal components into the $NH_3$ destruction catalyst compositions. For instance, platinum group metal-based catayst compositions have a low "light-off temperature" for ammonia conversion (temperature at which 50% $NH_3$ removal is observed). In addition, platinum group metal-based compositions are effective in combusting unburned hydrocarbons including gaseous hydrocarbons and liquid hydrocarbons (the soluble organic fraction of the particulate or "SOF"). This feature is particularly significant for emissions treatment systems that do not employ a separate diesel oxidation catalyst (DOC) substrate, and instead, use a staged SCR catalyst and $NH_3$ destruction catalyst as a stand alone system.

A drawback associated with use of platinum group metals, and in particular, platinum in the $NH_3$ destruction catalysts is that excess ammonia may be oxidized to form NOx instead of the innocuous products $N_2$ and $H_2O$. This drawback undermines efforts to reduce NOx in the exhaust below mandated levels.

SUMMARY OF THE INVENTION

In one aspect, the invention relates to an emissions treatment system. The treatment system has an injector for periodically metering ammonia or an ammonia precursor into an exhaust stream. The treatment system also has a first substrate with a first SCR catalyst composition, which is positioned downstream of the injector. The first substrate has an inlet end, an outlet end, a length extending between the inlet end to the outlet end, wall elements and a plurality of passages defined by the wall elements. The first SCR catalyst composition is disposed on the wall elements from the inlet end toward the outlet end to a length that is less than the substrate's axial length to form an inlet zone.

The first substrate also has an $NH_3$ destruction catalyst composition comprising a platinum group metal component dispersed on a refractory metal oxide, wherein the $NH_3$ destruction catalyst is disposed on the wall elements from the outlet end toward the inlet end to a length that is less than the substrate's axial length to form an outlet zone. There is from 0.1 to 10 $g/ft^3$ of platinum group metal component in the outlet zone. In some embodiments, the $NH_3$ destruction catalyst composition further contains a cerium component, which is preferably in bulk form.

The platinum group metal component can be selected from the group consisting of platinum, palladium, rhodium, iridium and combinations thereof. Preferably, the $NH_3$ destruction catalyst contains a platinum component. The catalytic activity of the platinum component can be moderated by sulfating the platinum component.

In some embodiments of the emissions treatment system, the first SCR catalyst composition contains $V_2O_5$, $WO_3$ and $TiO_2$. In other embodiments, the first SCR catalyst composition contains a copper-exchanged zeolite.

Typically, there is an uncoated zone of at least 0.25 inches between the inlet and outlet zones in the first substrate.

The first substrate is typically a honeycomb flow-through substrate. However, in some embodiments of the emissions treatment system, the first substrate is a honeycomb wall flow substrate.

In some embodiments of the emissions treatment system, there is a diesel engine upstream and in fluid communication with the injector.

In a preferred embodiment of the invention, the emission treatment system has a second substrate interposed and in fluid communication with the injector and the first substrate. The second substrate may be, for example, selected from the group consisting of a honeycomb flow-through substrate, an open-cell foam substrate and a honeycomb wall flow substrate. Preferably the second substrate is a honeycomb flow-through substrate with a second SCR catalyst composition. The first and second SCR catalyst compositions used to coat the first and second substrates, respectively, may be the same or different. However, in one preferred embodiment of the invention, the first and second SCR catalyst compositions are the same.

In another aspect, the invention relates to a method for reducing NOx emissions in the exhaust stream produced from an internal combustion engine. The method includes:

(a) metering at periodic intervals ammonia or an ammonia precursor into the exhaust stream; and (b) passing the exhaust stream through a first substrate comprising a first SCR catalyst composition.

Optionally, the method further includes (a1) passing the exhaust stream through a second substrate after (a) and prior to (b).

In the method, the first substrate has an inlet end, an outlet end, a length extending between the inlet end to the outlet end, wall elements and a plurality of passages defined by the wall elements. The first SCR catalyst composition is disposed on the wall elements from the inlet end toward the outlet end to a length that is less than the substrate's axial length to form an inlet zone.

The $NH_3$ destruction catalyst composition includes a platinum group metal component (preferably a platinum component) dispersed on a refractory metal oxide, wherein the $NH_3$ destruction catalyst is disposed on the wall elements from the outlet end toward the inlet end to a length that is less than the substrate's axial length to form an outlet zone. There is from 0.1 to 10 $g/ft^3$ of platinum group metal component in the outlet zone.

In optional embodiments of the invention, the second substrate of (a1) is selected from the group consisting of a honeycomb flow-through substrate, an open-cell foam substrate and a honeycomb wall flow substrate. Preferably, the second substrate of (a1) is a honeycomb flow-through substrate having a second SCR catalyst composition. Preferably, the first and second SCR catalyst compositions are the same.

Generally, the method is conducted wherein the amount of ammonia or ammonia precursor metered into the exhaust stream provides a normalized stoichiometric ratio of between 0.2 to 2.0.

In the method, the exhaust stream in the first substrate preferably has a space velocity of from 30,000 to 90,000 $hr^{-1}$ at rated power.

BRIEF DESCRIPTION OF THE DRAWINGS

FIGS. 3A, 3B and 3C are schematic depictions of three embodiments of the emissions treatment system of the invention.

FIGS. 4 illustrates an exemplary coating architecture in sectional view of a single passage of honeycomb flow through substrate.

DEFINITIONS

Figure 1:
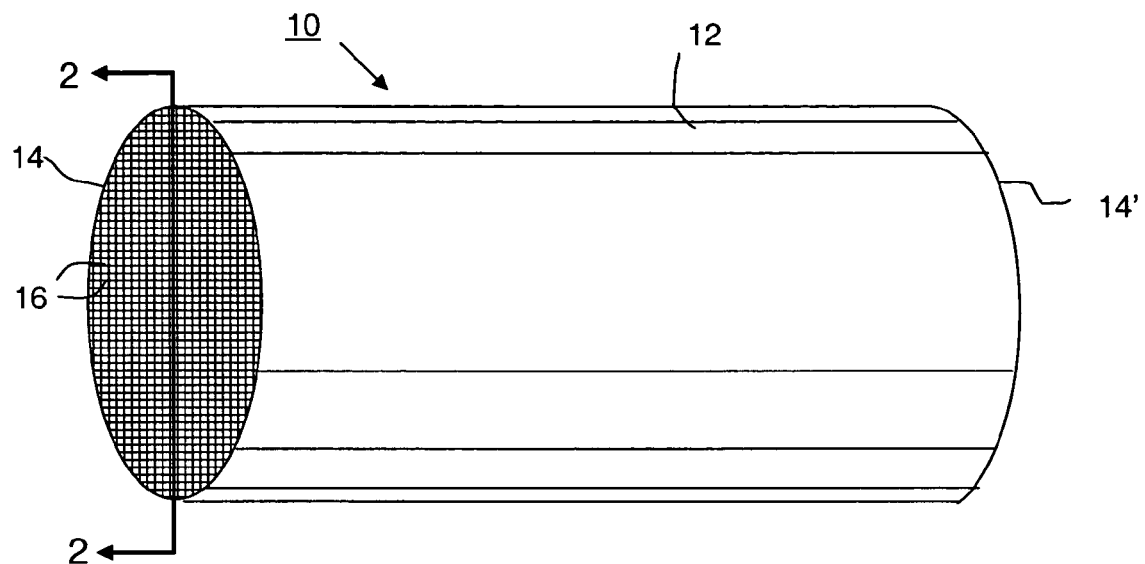
FIG. 1 is a perspective view of a honeycomb substrate.

The following terms shall have, for the purposes of this application, the respective meanings set forth below.

"Activated alumina" has its usual meaning of a high BET surface area alumina, comprising one or more of gamma-, theta- and delta aluminas.

"At rated power" refers to the maximum power output of the engine.

"BET surface area" has its usual meaning of referring to the Brunauer, Emmett, Teller method for determining surface area by $N_2$ absorption. Unless otherwise specifically stated, all references herein to the surface area of the catalyst support components or other catalyst components means the BET surface area.

"Bulk form," when used to describe the physical form of a material (e.g., ceria), means the material is present as discrete particles that can be as small as 1 to 15 microns in diameter or smaller, as opposed to having been dispersed in solution onto another material such as gamma alumina. By way of example, in some embodiments of the invention, particles of ceria are admixed with particles of gamma alumina so that ceria is present in bulk form, as opposed to, for example, impregnating alumina particles with aqueous solutions of ceria precursors which upon calcination are converted to ceria disposed on the alumina particles.

"Cerium component" means one or more oxides of cerium (e.g., $CeO_2$).

"Downstream" and "Upstream," when used to describe an article, catalyst substrate or zone, refer to the relative positions in the exhaust system as sensed in the direction of the flow of the exhaust gas stream.

"High surface area support" means support materials with a BET surface area that is approximately greater than 10 $m^2/g$, preferably greater than 150 $m^2/g$.

"Platinum group metal component" refers to the platinum group metals or oxides thereof. Preferred platinum group metal components are platinum, palladium, rhodium iridium components, and combinations thereof.

DETAILED DESCRIPTION OF THE INVENTION

Applicants have found a system that incorporates an integrated catalyst article having an SCR catalyst and $NH_3$ destruction catalyst on a single substrate that simultaneously provides efficient NOx conversion and destruction of excess ammonia. The catalyst article is composed of a coated substrate having two catalytic zones; an inlet zone suited for the SCR reaction and an outlet zone suited for the destruction (oxidation) of $NH_3$.

One desirable feature of the article is that the outlet zone ($NH_3$ destruction catalyst-containing zone) can accommodate the inevitable excesses of ammonia that emerge from the inlet zone (SCR catalyst-containing zone) due to the factors noted above, without forming NOx from the excess ammonia. Applicant has found that by limiting the amount of platinum group metal component in the $NH_3$ destruction catalyst (e.g., less than 10 $g/ft^3$, preferably less than 5 $g/ft^3$), effective and selective conversion of ammonia to $N_2$ and $H_2O$ is provided without NOx formation. Emissions treatment systems that employ the inventive zoned articles can reduce NOx to $N_2$ while simultaneously providing for at least partial abatement of other components of the exhaust including unburned gaseous hydrocarbons, CO, and the SOF.

Another desirable feature of employing the zoned SCR-$NH_3$ destruction catalyst in emissions treatment systems is a space-saving benefit gained by integrating two catalyst functions on a single substrate. In some embodiments of the invention, the integration of catalyst functions also eases the burden of housing additional catalyst substrates in canisters in the exhaust system (often also referred to as "canning substrates").

In addition to oxidizing any breakthrough $NH_3$ passing through unreacted through the inlet zone to $N_2$ and $H_2O$, the outlet zone of the zoned articles is also capable of oxidizing CO and gaseous hydrocarbons in the exhaust to $CO_2$ and water. Catalysts suitable for the oxidation of ammonia have also been shown to be effective in treating the SOF in the diesel exhaust which also contributes to particulate emissions. Such catalysts are preferably formulated to minimize the oxidation of $SO_2$ to $SO_3$ because emissions of $SO_3$ also contribute to particulate emissions.

Figure 2:
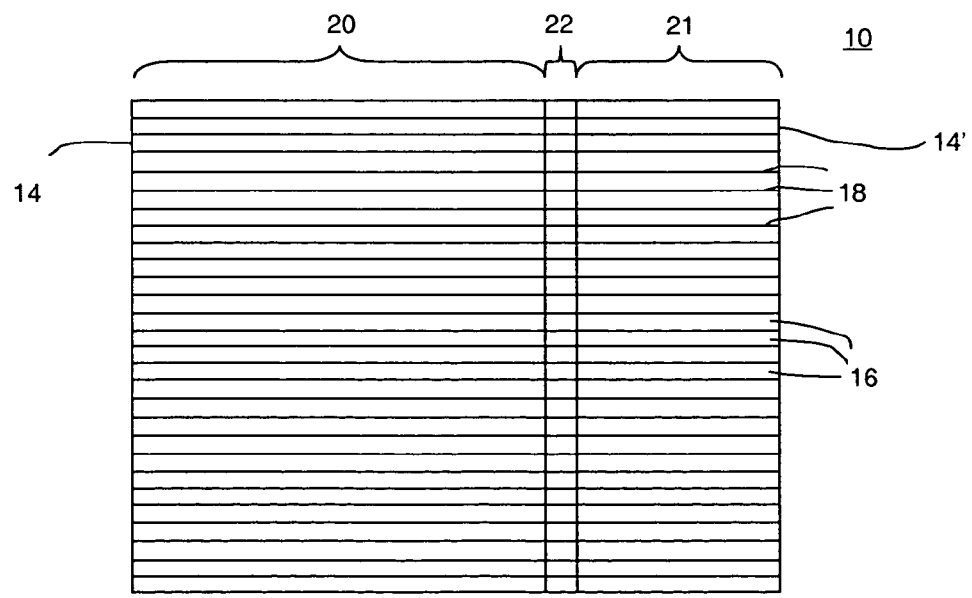
FIG. 2 is a sectional view of the honeycomb substrate of FIG. 1 along Section 2-2.

FIGS. 1 and 2 illustrate a typical honeycomb-type flow through substrate that can be used in the articles of the invention. The honeycomb flow through substrate 10 has an outer surface 12, an inlet end 14 and an outlet end 14'. There is a plurality of parallel passages 16 defined by the substrate's wall elements 18. Each passage has a corresponding inlet and outlet. The catalyst is coated on the wall elements so that the gases flowing through the passages contact the catalyst. The substrate has different coated zones 20 (inlet zone) and 21 (outlet zone) along the length of the passages. In the embodiment shown in FIG. 2, there is also a short, uncoated zone 22 between the coated zones.

FIG. 4 depicts a single passage of a zoned coated honeycomb flow through substrate 10 having an inlet end 14, an outlet end 14', wall elements 18, a passage defined by the wall elements 16, an inlet zone 20 and a outlet zone 21. The inlet zone has an SCR catalyst composition 28 disposed on the wall elements from the inlet end toward the outlet end to a length that is less than the substrate's axial length. The outlet zone has an $NH_3$ destruction catalyst composition 29 disposed on the wall elements from the outlet end toward the inlet end to a length that is less then the substrate's axial length. An uncoated segment of the wall elements forms an uncoated zone 22 along the axial length of the substrate.

One embodiment of the inventive emissions treatment system denoted as 10A is schematically depicted in FIG. 3A. The exhaust, containing gaseous pollutants (including unburned hydrocarbons, carbon monoxide and NOx) and particulate matter, is conveyed from the engine 19 to a position downstream in the exhaust system where a reductant, i.e., ammonia or an ammonia-precursor, is added to the exhaust stream. The reductant is injected as a spray via a nozzle (not shown) into the exhaust stream. Aqueous urea shown on one line 25 can serve as the ammonia precursor which can be mixed with air on another line 26 in a mixing station 24. Valve 23 can be used to meter precise amounts of aqueous urea which are converted in the exhaust stream to ammonia.

The exhaust stream with the added ammonia is conveyed to the zoned SCR-$NH_3$ destruction catalyst substrate 12 (also referred to herein including the claims as "the first substrate"). On passing through the first substrate 12, the NOx component of the exhaust stream is converted through the selective catalytic reduction of NOx with $NH_3$ to $N_2$ and $H_2O$. In addition, excess $NH_3$ that emerges from the inlet zone is converted through oxidation in the outlet zone to $N_2$ and $H_2O$. Moreover, it is noted that other components of the exhaust are combusted by the action of the SCR catalyst and $NH_3$ destruction catalyst. For instance, typically at least some portion of the unburned gaseous hydrocarbons, carbon monoxide and particulate matter in the exhaust stream is converted to innocuous components through contact with the catalytic compositions of the first substrate. The first substrate is typically a flow through monolith substrate.

An alternative embodiment of the emissions treatment system, denoted as 11B is depicted in FIG. 3B which contains a second substrate 27 interposed between the $NH_3$ injector and the first substrate 12. In this embodiment, the second substrate is coated with an SCR catalyst composition which may be the same composition as is used to coat the first substrate 13 or a different composition. An advantageous feature of this embodiment is that the SCR catalyst compositions that are used to coat the substrate can be selected to optimize NOx conversion for the operating conditions characteristic of that site along the exhaust system. For example, the second substrate can be coated with an SCR catalyst composition that is better suited for higher operating temperatures experienced in upstream segments of the exhaust system, while another SCR composition can be used to coat the first substrate (i.e., the inlet zone of the first substrate) that is better suited to cooler exhaust temperature which are experienced in downstream segments of the exhaust system.

In the embodiment depicted in FIG. 3B, the second substrate 27 can either be a honeycomb flow through substrate, an open cell foam substrate or a honeycomb wall flow substrate. In configurations of this embodiment where the second substrate is a wall flow substrate or a high efficiency open cell foam filter, the system can remove greater than 80% of the particulate matter including the soot fraction and the SOF. An SCR-coated wall flow substrate and its utility in the reduction of NOx and particulate matter have been described, for instance, in co-pending U.S. patent application Ser. No. 10/634,659, filed Aug. 5, 2003, the disclosure of which is hereby incorporated by reference.

In some applications it may be advantageous to include an oxidation catalyst upstream of the site of ammonia/ammonia precursor injection. For instance, in the embodiment depicted in FIG. 3C an oxidation catalyst is disposed on a catalyst substrate 34. The emissions treatment system 11C is provided with the first substrate 12 and optionally includes a second substrate 27. In this embodiment, the exhaust stream is first conveyed to the catalyst substrate 34 where at least some of the gaseous hydrocarbons, CO and particulate matter are combusted to innocuous components. In addition, a significant fraction of the NO of the NOx component of the exhaust is converted to $NO_2$. Higher proportions of $NO_2$ in the NOx component facilitate the reduction of NOx to $N_2$ and $H_2O$ on the SCR catalyst(s) located downstream.

SCR Catalyst Compositions

Suitable SCR catalyst compositions that may be used to coat the inlet zone of the first substrate and/or the second substrate (in embodiments depicted in FIG. 3B) are described, for instance, in U.S. Pat. No. 4,961,917 (the '917 patent) and U.S. Pat. No. 5,516,497 (the '497 patent), which are both hereby incorporated by reference in their entirety. Compositions disclosed in the '917 patent include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of NOx with $NH_3$ to $N_2$, the disclosed compositions can also promote the oxidation of excess $NH_3$ with $O_2$, especially for those compositions having higher promoter concentrations.

Zeolites used in such compositions are resistant to sulfur poisoning, sustain a high level of activity for the SCR process, and are capable of oxidation of excess ammonia with oxygen. These zeolites have pore size large enough to permit adequate movement of the reactant molecules NOx and $NH_3$ in to, and the product molecules $N_2$ and $H_2O$ out of, the pore system in the presence of sulfur oxide molecules resulting from short term sulfur poisoning, and/or sulfate deposits resulting from long term sulfur poisoning. The pore system of suitable size is interconnected in all three crystallographic dimensions. As will be apparent to those skilled in the zeolite art, the crystalline structure of zeolites exhibits a complex pore structure having more or less regularly recurring connections, intersections and the like. Pores having a particular characteristic, such as a given dimension diameter or cross-sectional configuration, are said to be one dimensional if those pores do not intersect with other like pores. If the pores intersect only within a given plane with other like pores, the pores of that characteristic are said to be interconnected in two (crystallographic) dimensions. If the pores intersect with other like pores lying both in the same plane and in other planes, such like pores are said to be interconnected in three dimensions, i.e., to be "three dimensional". It has been found that zeolites which are highly resistant to sulfate poisoning and provide good activity for both the SCR process and the oxidation of ammonia with oxygen, and which retain good activity even when subject to high temperatures, hydrothermal conditions and sulfate poisons, are zeolites which have pores which exhibit a pore diameter of at least about 7 Angstroms and are interconnected in three dimensions. Without wishing to be bound by any specific theory, it is believed that the interconnection of pores of at least 7 Angstroms diameter in three dimensions provides for good mobility of sulfate molecules throughout the zeolite structure, thereby permitting the sulfate molecules to be released from the catalyst to free a large number of the available adsorbent sites for reactant NOx and $NH_3$ molecules and reactant $NH_3$ and $O_2$ molecules. Any zeolites meeting the foregoing criteria are suitable for use in the practices of the present invention; specific zeolites which meet these criteria are USY, Beta and ZSM-20. Other zeolites may also satisfy the aforementioned criteria.

When deposited on monolith substrates, such SCR catalyst compositions are deposited at a concentration of at least 1.3 $g/in^3$ to ensure that the desired NOx reduction and particulate removal levels are achieved and to secure adequate durability of the catalyst over extended use. In a preferred embodiment, there is at least 1.8 $g/in^3$ of SCR composition, and in particular, 1.8 to 2.6 $g/in^3$, disposed on the monolith.

Preparation of base metal-exchanged zeolite compositions including copper-exchanged compositions are disclosed in the '497 patent.

In one preferred embodiment of the invention, the SCR catalyst composition that is coated on the zone-coated monolith is a copper-exchanged zeolite. Such compositions typically have an effective SCR catalyst operating temperature range of from 150 to 550° C.

Other suitable SCR catalyst compositions include vanadia-based SCR compositions. For instance, a preferred SCR catalyst is a mixed oxide composition of $V_2O_5/WO_3/TiO_2$. Such vanadia-based compositions have an effective operating range of from 200 to 500° C. Suitable vanadia-based compositions are also disclosed, for example, in U.S. Pat. No. 4,883,113 ("the '113 patent). Catalyst compositions disclosed in the '113 patent contain oxides of titanium, tungsten and vanadium as active ingredients, and can be formed onto carrier components that include natural and synthetic zeolites, silica-alumina, silica-magnesia, silica-alumina-magnesia, silica, and titania-silica.

$NH_3$-Destruction Catalyst Compositions

The $NH_3$ destruction catalyst is composed of a platinum group metal component dispersed on a refractory inorganic oxide support. When the $NH_3$ destruction catalyst is deposited on the monolith carrier, the platinum group metal component is typically present at from 0.1 to 10 $g/ft^3$, and preferably, from 0.5 to 5 $g/ft^3$. At these concentrations the platinum group metal component is effective for the oxidation of ammonia to form $N_2$, but has a diminished propensity to cause oxidation of ammonia to form NOx. As described above, higher concentrations of platinum in the composition are liable to promote the conversion of excess ammonia to NOx and not to $N_2$. Moreover, lower levels of platinum group metal components are desired to minimize the formation of sulfates that contribute to the mass of the particulate matter that is discharged to the atmosphere.

Preferred platinum group metal components include platinum, palladium, rhodium and iridium components. Most preferably the platinum group metal component is a platinum component.

In embodiments of the invention, where platinum is used in the $NH_3$ destruction catalyst, the platinum component can be sulfated to further moderate the catalytic activity of the platinum component and control NOx formation. The sulfation can be performed by treatment of the composition with sulfuric acid, or alternatively, by subjecting the final coated composition to an exhaust stream derived from an internal combustion engine that uses fuel that contains higher levels of sulfur component (e.g.,>350 ppm).

A preferred $NH_3$ destruction catalyst material is composed of platinum dispersed on one or both of bulk ceria and activated alumina. Such compositions are similar to those described in U.S. Pat. No. 5,462,907, the disclosure of which is hereby incorporated by reference. The catalytic material can be prepared in the form of an aqueous slurry of ceria and alumina particles, the particles being impregnated with the a water-dispersible or water-soluble platinum precursor. The slurry can then applied to the carrier, dried and calcined to form a catalytic material coating ("washcoat") thereon. Typically, the ceria and alumina particles are mixed with water and an acidifier such as acetic acid, nitric acid or sulfuric acid, and ball milled to a desired particle size. Alternatively the slurry can be dried and calcined before being coated on the carrier.

The platinum catalytic metal component is preferably incorporated into the ceria particles or into the ceria and alumina particles. The ceria-alumina acts not only as a catalyst but also as a support for the platinum catalytic metal component. Such incorporation with the platinum precursor can also be conducted after the ceria-alumina catalytic material is coated as a washcoat onto a suitable carrier, by impregnating the coated carrier with a solution of a suitable platinum precursor, followed by drying and calcination. However, preferably, the ceria particles or both the ceria and alumina particles are impregnated with a suitable platinum precursor before a coating of the ceria-alumina catalytic material is applied to the carrier. In either case, the platinum metal is added to the ceria-alumina catalytic material as, e.g., a solution of a soluble platinum compound, the solution serving to impregnate the ceria and alumina particles (or the ceria-alumina coating on the carrier), which may then be dried and the platinum fixed thereon. Fixing can be carried out by calcination or by treatment with hydrogen sulfide or by other known means, to render the metal in water-insoluble form.

Generally, the slurry of ceria and activated alumina particles, with the platinum solution, will be deposited upon the carrier substrate and dried and calcined to adhere the catalytic material to the carrier and, to revert the platinum compound to the elemental metal or its oxide. Suitable platinum precursors for use in the foregoing process include potassium platinum chloride, ammonium platinum thiocyanate, amine-solubilized platinum hydroxide and chloroplatinic acid, as is well-known in the art. During calcination, or at least during the initial phase of use of the catalyst, such compounds, if present, are converted into the catalytically active elemental platinum metal or its oxide.

When the catalytic material is applied as a thin coating to a suitable carrier, such as described above, the proportions of ingredients are conventionally expressed as weight of material per gross unit volume of catalyst, as this measure accommodates the presence of different cell densities, wall thicknesses, gas flow passages, etc. Grams per cubic inch ("$g/in^3$") units are used to express the quantity of relatively plentiful components such as the ceria-alumina catalytic material, and grams per cubic foot ("$g/ft^3$") units are used to express the quantity of the sparsely used ingredients, such as the platinum metal. For typical diesel exhaust applications, the ceria-alumina catalytic material of the present invention generally may comprise from about 0.25 to about 4.0 $g/in^3$, preferably from about 0.25 to about 3.0 $g/in^3$ of the coated carrier substrate, and from about 0.1 to 10 $g/ft^3$ of platinum.

Generally, other ingredients may be added to the catalyst composition of the present invention such as conventional thermal stabilizers for the alumina, e.g., rare earth metal oxides such as ceria. Thermal stabilization of high surface area ceria and alumina to prevent phase conversion to less catalytically effective low surface area forms is well-known in the art. Such thermal stabilizers may be incorporated into the bulk ceria or into the bulk activated alumina, by impregnating the ceria (or alumina) particles with, e.g., a solution of a soluble compound of the stabilizer metal, for example, an aluminum nitrate solution in the case of stabilizing bulk ceria. Such impregnation is then followed by drying and calcining the impregnated ceria particles to convert the aluminum nitrate impregnated therein into alumina.

In addition, the catalyst compositions of the invention may contain other catalytic ingredients such as other base metal promoters or the like. However, in one embodiment, the catalyst composition of the present invention consists essentially only of the high surface area ceria and high surface area alumina, preferably present in a weight proportion of 1.5:1 to 1:1.5, with or without thermal stabilizers impregnated therein, and, from 0.1 to 10 $g/ft^3$ of platinum.

Preferred Configuration of The System

In one preferred configuration of the invention, the zoned SCR-$NH_3$ destruction catalyst substrate has an inlet zone formed with a vanadium based SCR catalyst composition, $V_2O_5WO_3/TiO_2$, and an outlet zone formed with platinum-based $NH_3$ destruction catalyst composition, $Pt/CeO_2/Al_2O_3$. A desirable feature of this configuration is that the platinum-based composition, in addition to its $NH_3$ oxidation activity, can also reduce NOx at lower temperature ranges where the vanadium-based composition is ineffective. This catalytic property widens the effective temperature range of the article over which NOx can be converted to $N_2$.

In another preferred configuration of the invention, the zoned SCR-$NH_3$ destruction catalyst substrate has an inlet zone formed with a copper-exchanged beta zeolite composition and an outlet zone formed with platinum-based $NH_3$ destruction catalyst composition, $Pt/CeO_2O_2/Al_2O_3$.

The space velocity of the combined SCR and $NH_3$ destruction catalyst is typically from 5,000 to 100,000 $hr^{-1}$, and preferably, from 30,000 to 90,000 $hr^{-1}$. In any application there will be a range of space velocities, resulting from the operating range of the engine or exhaust source. The catalyst system in a passenger car, for instance, will typically operate at higher space velocities compared to a heavy duty truck. The space velocity of the exhaust gas through the outlet zone alone ($NH_3$ destruction zone) is typically between 40,000 to 200,000 $hr^{-1}$, and preferably between 50,000 to 150,000 $hr^{-1}$. Generally, higher space velocities are more preferable at exhaust temperatures above 350° C. Lower space velocities corresponding to a larger $NH_3$ destruction zone (outlet zone) are less desirable due to increased costs associated with higher platinum group metal usage.

The Carrier (Substrate)

The carriers used for the first substrate should be relatively inert with respect to the catalytic composition dispersed thereon. Preferred carriers are composed of ceramic-like materials such as cordierite, α-alumina, silicon nitride, silicon-carbide, zirconia, mullite, spodumene, alumina-silica-magnesia or zirconium silicate, or of refractory metals such as stainless steel. In one preferred embodiment, the carriers are preferably of the type sometimes referred to as honeycomb or monolithic carriers, comprising a unitary cylindrical body having a plurality of fine, substantially parallel gas flow passages extending through and connecting both end-faces of the carrier to provide a "flow-through" type of carrier. Such monolithic carriers may contain up to about 700 or more flow channels ("cells") per square inch of cross section, although far fewer may be used. For example, the carrier may have from about 7 to 900, more usually from about 200 to 400, cells per square inch ("cpsi").

In embodiments of the invention having a second substrate as shown in FIG. 3B, the second substrate may be of the flow through type or an open-cell foam filter as described above, or it may be of wall flow type. Wall flow substrates useful for supporting the SCR catalyst compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. Preferred wall flow substrates have a wall thickness of between 0.002 and 0.015 inches. Useful wall flow filters which can be used for the second substrate are discussed in co-pending U.S. patent application Ser. No. 10/634,659, filed Aug. 5, 2003.

Figure 5:
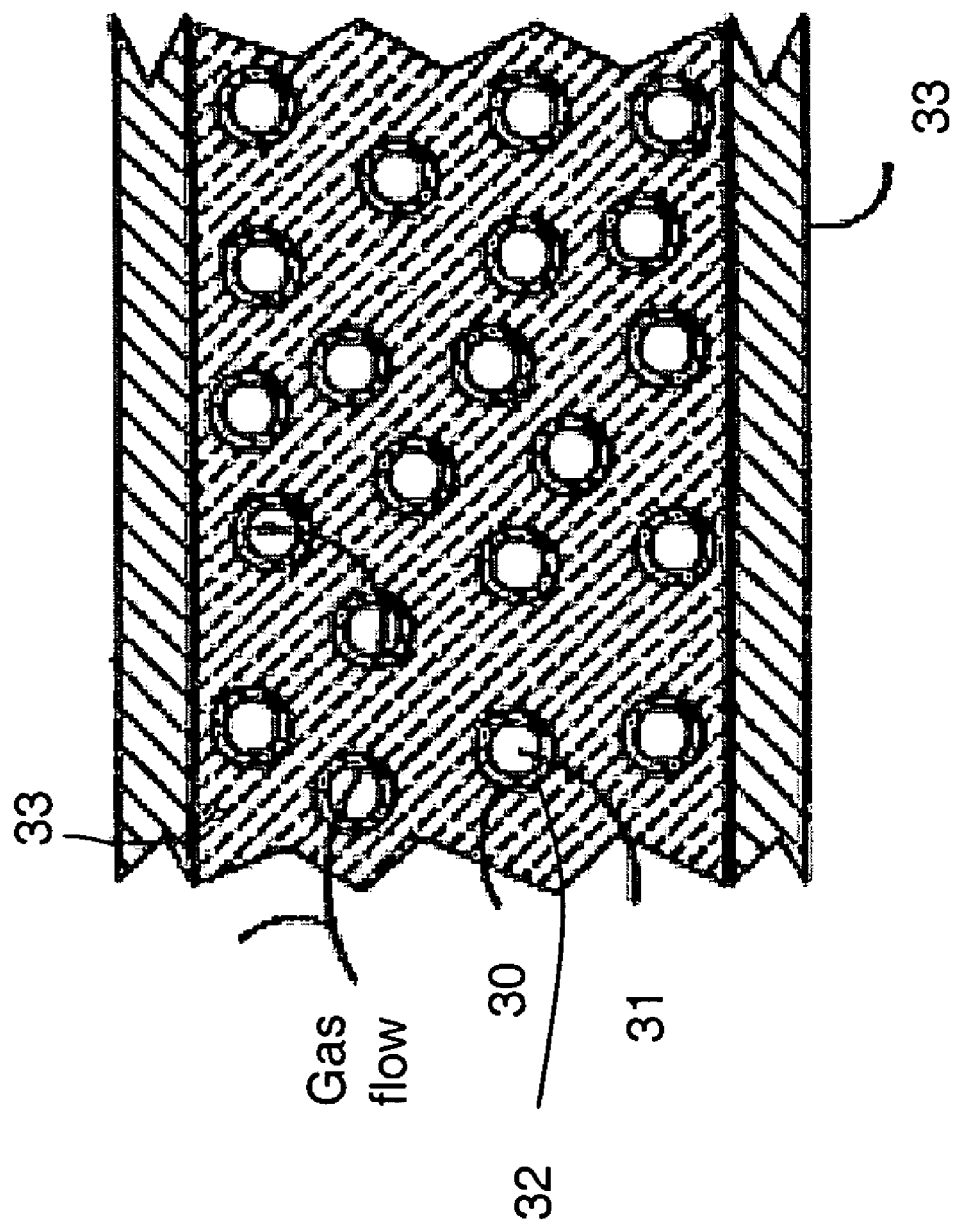
FIG. 5 illustrates a cutaway section of a typical substrate of the foam-type.

In alternative embodiments of the invention, the second substrate can be an open cell foam substrate that contains a plurality of pores. FIG. 5 illustrates a cutaway section of a typical substrate of the foam-type. The foam 33 is an open-celled foam and the catalyst coating 30 is deposited on the walls 32 of the cells 31. The open-celled structure of the foam provides the coated substrate with a high surface area of the catalyst per volume. An exhaust stream passing through the substrate from the inlet end to the outlet end of the substrate flows through though the plurality of cells defined by the walls of the foam to contact the catalyst layer deposited on the walls of the cells.

The foam substrate may be composed of metallic or ceramic materials. Examples of ceramic foams are disclosed in U.S. Pat. No. 6,077,600, which is herein incorporated by reference. Ceramic foam carriers have walls formed from fibers coated with ceramic materials. Substrates in the form of metal foams are well known in the prior art, e.g., see U.S. Pat. No. 3,111,396, which is herein incorporated by reference.

The zone coated article can be prepared by disposing the SCR catalyst composition and $NH_3$ destruction catalyst composition on a honeycomb flow through substrate. The SCR catalyst composition can be combined with water and comminuted to achieve an average particle size of $\leq 10$ μ to form a washcoat composition. The washcoat slurries are deposited on the substrates by methods well-known to those of ordinary skill. Thus, for example, in a typical honeycomb substrate preparation, a layer of the SCR catalyst can be prepared by dipping the substrate from the inlet end in a reservoir containing a sufficient volume of the washcoat slurry so that the substrate is coated to a desired length of the substrate to form the inlet zone. The coated substrate can be subsequently dried. To form the outlet zone, the outlet end of the substrate is dipped into a slurry containing the finely comminuted $NH_3$ destruction catalyst slurry to the desired length. The entire substrate is then dried and calcined. Preferably, a gap of at least 0.25 inches is left between the two catalyst zone to avoid contamination of the two catalyst compositions, and any potential loss of catalytic activity caused by mixture of the two compositions.

A reductant dosing system is provided upstream of the zoned SCR-$NH_3$ destruction catalyst to inject a NOx reductant into the exhaust stream. As disclosed in U.S. Pat. No. 4,963,332, NOx upstream and downstream of the catalytic converter can be sensed, and a pulsed dosing valve can be controlled by the upstream and downstream signals. In alternative configurations, the systems disclosed in U.S. Pat. No. 5,522,218, where the pulse width of the reductant injector is controlled from maps of exhaust gas temperature and engine operating conditions such as engine rpm, transmission gear and engine speed. Reference is also made to the discussion of reductant pulse metering systems in U.S. Pat. No. 6,415,602, the discussion of which is hereby incorporated by reference.

Normally, the amount of ammonia or ammonia precursor metered into the exhaust stream provides a normalized stoichiometric ratio of between 0.2 to 2.0.

The following examples further illustrate the present invention, but of course, should not be construed as in any way limiting its scope.

EXAMPLE 1

Preparation of Zoned Substrate with an Inlet Zone Having a Copper-exchanged Beta-zeolite Catalyst Composition and an Outlet Zone Having a Platinum-containing Catalyst (Catalyst Substrate A1).

Catalyst Substrate A1 was a zone coated catalyst substrate containing an inlet zone having a copper-exchanged beta-zeolite catalyst composition as an SCR catalyst and an outlet zone containing platinum-containing catalyst composition as an $NH_3$ destruction catalyst.

Preparation of the washcoat slurry used to form the SCR catalyst is described below (Slurry A1). Copper-exchanged β-zeolite (5733.6 g) was combined with a surfactant (0.10% by weight of solids), 90% acetic acid (2.0% by weight of solids) and sufficient water to form a slurry containing 38% by weight of solids. The mixture was milled continuously so that 90% of the particles had a particle size of 13 microns. Zirconium acetate (266.4 g) was added, and mixing was continued in a high shear mixer for an additional 20 min. The slurry was diluted with more water to form the washcoat slurry containing 36% by weight of solids.

Preparation of the washcoat slurry (Slurry B3) used to form the $NH_3$ destruction catalyst is described below. First a slurry containing platinum dispersed on bulk ceria was prepared (Slurry B1). Bulk ceria (2758.72 g) was combined with sufficient water to form a slurry containing 60% by weight of solids. An aqueous solution of amine-solubilized platinum hydroxide (17.68 g) was added to the slurry, and the resulting slurry was mixed for 5 min. 90% Acetic acid (7.0% by weight of ceria solids) and surfactant (0.05% by weight of total solids) were added to the slurry and the slurry was milled continuously so that 90% of the particles had a particle size of 8 microns.

Second, a slurry containing platinum dispersed on bulk ceria was prepared (Slurry B2). Gamma alumina (3238.50 g) was combined with sufficient water to form a slurry containing 50% by weight of solids. An aqueous solution of amine-solubilized platinum hydroxide (17.68 g) was added to the slurry, and the resulting slurry was mixed for 10 min. 90% Acetic acid (7.5% by weight of alumina solids) and surfactant (0.07% by weight of total solids) were added to the slurry and the slurry was milled continuously so that 90% of the particles had a particle size of 8 microns.

Slurry B1 and Slurry B2 were combined and mixed for 10 min to for Slurry B3. Slurry B3 was diluted with more water to form a washcoat slurry containing 50% by weight of solids.

Slurries A1 and B3 were used to coat a 400 cpsi, 9.5 in diameter×7.5 in long cordierite honeycomb substrate. First, the $NH_3$ destruction catalyst was applied to the substrate using a two coat process. The outlet end of the substrate was dipped into Slurry B3 to a depth of about 2 in. The coated substrate was removed from the dipping tank and excess slurry was allowed to drain off. To set the slurry and further remove excess slurry, pressurized air was passed through the substrate. The draining and the air blowing steps were conducted carefully to prevent the slurry from contacting the uncoated segment of the substrate. The substrate was dried and calcined. The second coat of Slurry B3 was then applied in identical fashion, and again the substrate was dried and calcined. Second, the SCR catalyst composition was applied to the substrate's inlet end. The inlet end of the substrate was dipped into Slurry A1 to a depth of about 5 in. A gap of 0.5 in was thereby left between the two coating zones. The coated substrate was removed from the dipping tank and excess slurry was allowed to carefully drain off. Again pressurized air was carefully passed through the substrate to avoid contacting the outlet zone with Slurry A1. The substrate was dried and calcined. The second coat of Slurry A1 was then applied in identical fashion, and again, the substrate was dried and calcined.

The inlet zone of the final coated substrate contained 2.15 $g/in^3$ of copper β-zeolite (0.07 $g/in^3$ of copper), and 0.10 $g/in^3$ of $ZrO_2$.

The outlet zone of the final coated substrate contained 1.35 $g/in^3$ of $Al_2O_3$, 1.15 $g/in^3$ of $CeO_2$, and and 2 $g/ft^3$ of Pt.

This coated substrate was designated as Catalyst Substrate A-1.

EXAMPLE 2

Preparation of Zoned Substrate with an Inlet Zone Having a Vanadium-based Catalyst Composition and an Outlet Zone Having a Platinum-containing Catalyst-substrate D-1.

Substrate D-1 was a zone coated substrate containing an inlet zone having a vanadium-based catalyst composition as an SCR catalyst and an outlet zone containing a platinum-containing catalyst composition as an $NH_3$ destruction catalyst.

Preparation of the washcoat slurry (Slurry C1) used to form the SCR catalyst is described below. Ammonium metavanadate (2001.96 g) was added to a heated solution of citric acid in water. The mixture was agitated for 30 min and then cooled to room temperature. Colloidal silica (4666.57 g) and additional water were added to the cooled mixture, and the resulting mixture was mixed for 5 min using a high shear mixer. A first portion of 10 wt. % tungsten (VI) oxide dispersed on titanium dioxide (74665.17 g) was added to the mixture and the resulting mixture was mixed for 5 min. Ammonium hydroxide was added in increments to adjust the pH of the mixture to 5.0-5.5, and mixing was continued for an additional 5 min. A second portion of 10wt. % tungsten oxide dispersed on titanium dioxide (18666.29 g) was added to the mixture, and the resulting mixture was mixed for 5 min. Ammonium hydroxide was added incrementally to adjust the pH of the mixture to 5.0-5.5, and mixing was continued for an additional 5 min. Ammonium salt of polyacrylic acid was added in increments to adjust the viscosity of the mixture. Additional water was added to achieve a solids content of 41% by weight. The resulting slurry was designated as Slurry C1.

Slurries C1 and B3 (prepared as described above in Example 1) were used to coat a 400 cpsi, 10.5 in diameter×6 in long cordierite honeycomb substrate. First, the $NH_3$ destruction catalyst was applied to the substrate using a two coat process. The outlet end of the substrate was dipped into Slurry B3 to a depth of 2 in. The coated substrate was removed from the dipping tank and excess slurry was carefully allowed to drain off. Pressurized air was passed through the substrate carefully to avoid contact of Slurry B3 with the upstream zone. The substrate was dried and calcined. The second coat of Slurry B3 was then applied in identical fashion, and again the substrate was dried and calcined.

Next the SCR catalyst composition was applied to the substrate's inlet end using a two coat process. The inlet end of the substrate was dipped into Slurry C1 to a depth of 3.5 in. To set the slurry and further remove excess slurry, pressurized air was passed through the substrate. The draining and the air blowing steps were conducted carefully to prevent the slurry from contacting other segments of the substrate. The substrate was dried and calcined. The second coat of Slurry C1 was then applied in identical fashion, and the substrate was dried and calcined.

The inlet zone of the final coated substrate contained 2.33 g/in$^3$ of WO$_3$ on TiO$_2$, and 0.05 g/in$^3$ of V$_2$O$_5$, 0.12 g/in$^3$ of SiO$_2$.

The outlet zone of the final coated substrate contained 1.35 g/in$^3$ of Al$_2$O$_3$, 1.15 g/in$^3$ of CeO$_2$, and 2 g/ft$^3$ of Pt.

This coated substrate was designated as Catalyst Substrate B-1.

EXAMPLE 3

Evaluation of Catalyst Substrate A1 for NOx Conversion and NH$_3$-Removal

Samples for evaluation were previously cut cores or were cored from larger pieces using the full length of the substrate. Each sample was approximately 1 inch in diameter. Prior to testing the honeycombs were trimmed to an approximately square cross section and total number of cells exposed to the gas flow were counted. Knowing the number of open cells, the "honeycomb cell density" (cells per square inch) and the sample length, it was possible to accurately determine the gas flow to achieve a targeted space velocity. The space velocity has units of 1/hours (hr$^{-1}$) and was calculated with the gas flow referred to engineering standard conditions (20° C., 1 atm). To ensure that gas flows only though the sample, a ceramic felt was wrapped around the sample and then the whole assembly was press fit into a metal sample holder.

Figure 6:
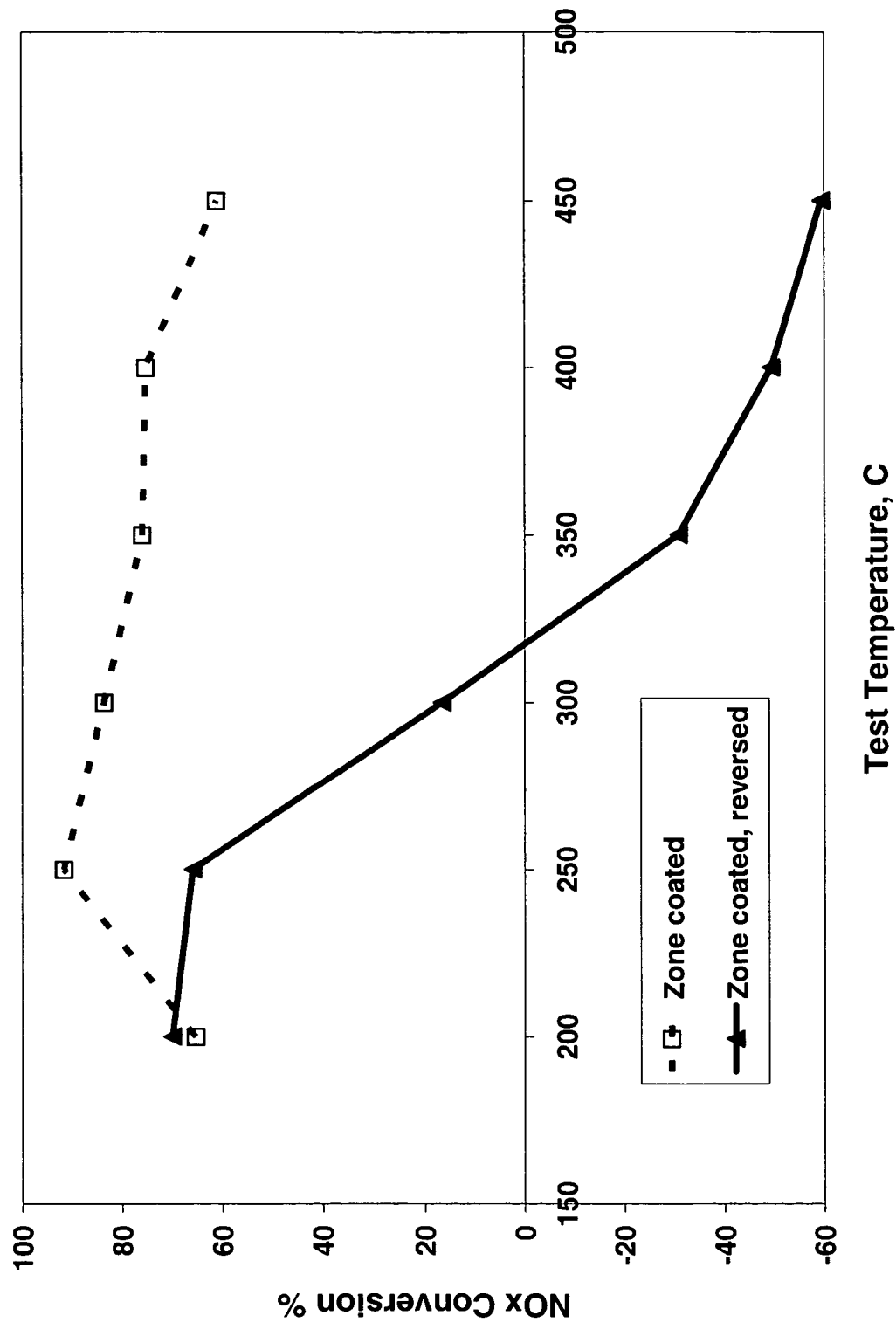
FIG. 6 shows % NOx conversion for test gas temperature for a zone coated Catalyst Substrate A1.
Figure 7:
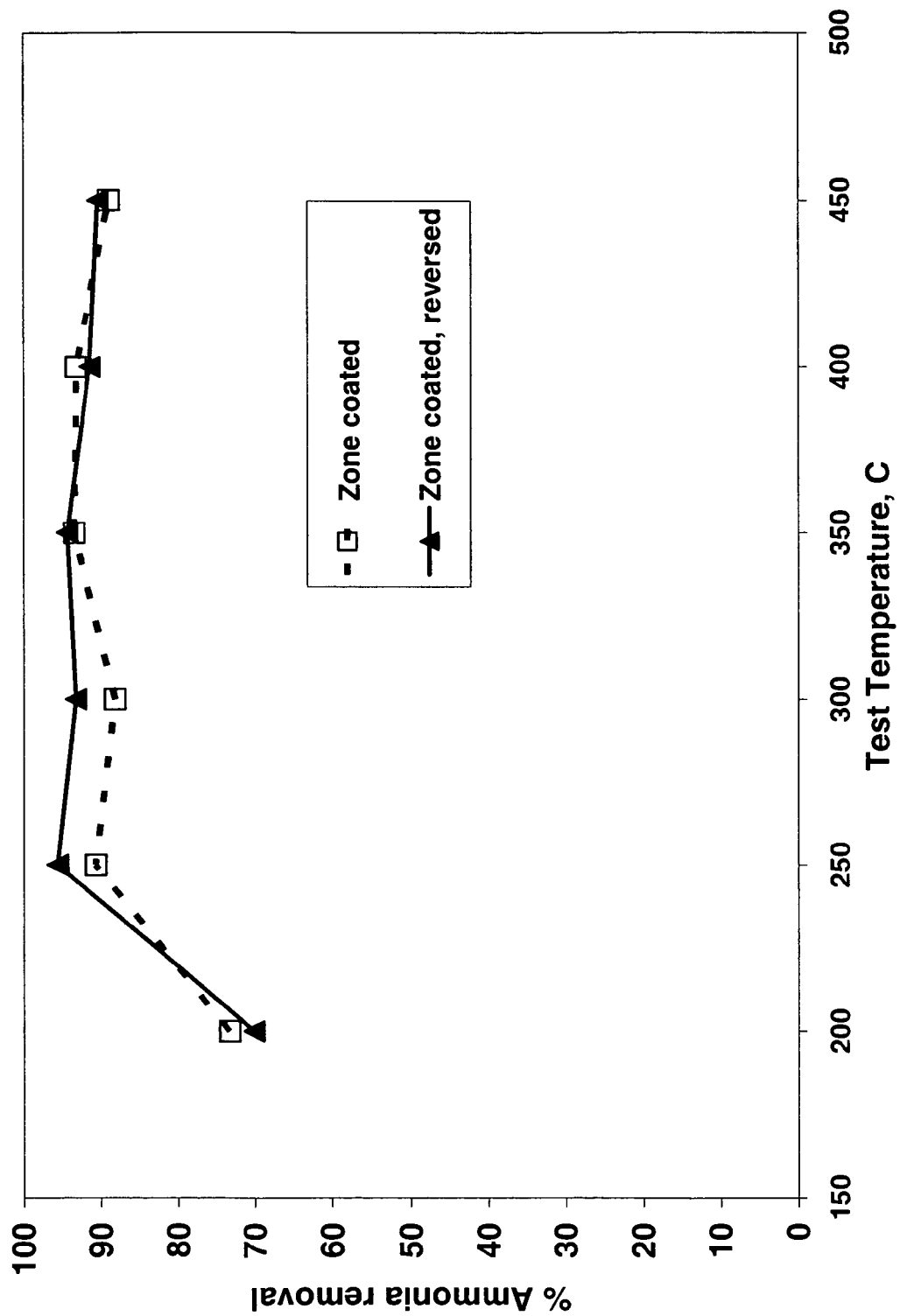
FIG. 7 shows % $NH_3$ removal for test gas temperature for a zone coated Catalyst Substrate A1.

Evaluations were conducted using a test gas composition containing 500 ppm ammonia, 500 ppm of NO, 10% oxygen, 5% water vapor and the balance nitrogen. NOx and ammonia was measured at the catalyst inlet and outlet. The space velocity of the test gas composition was 60,000 hr$^{-1}$. The temperature range tested in the trials was 200 to 450° C. In evaluating the catalyst's ability to treat NOx, catalyst performance was reported as the NOx conversion, based on the inlet NO concentration. In evaluating the catalyst's performance ability to treat ammonia, catalyst performance was reported as the percentage disappearance of ammonia, along with the percentage removal of NO (or percentage make), based on the inlet ammonia concentrations. Data generated for % NOx conversion is shown in FIG. 6. Data generated for NH$_3$ removal is shown in FIG. 7.

In one set of trials, Catalyst Substrate A1 was placed in the sample holder in the conventional direction, where the first zone encountering the test gas composition contained the SCR catalyst composition. The data curve generated by placing the substrate in the sample holder in this direction is designated as "Conventional" in FIGS. 6-7.

In the other set of trials, Catalyst Substrate A1 was placed in the sample holder in the reversed direction, where the first zone encountering the test gas composition contained the NH$_3$ destruction catalyst composition. The data curve generated by placing the substrate in the sample holder in this direction is designated as "Reversed" in FIGS. 6-7.

NH$_3$ removal efficiency was maintained throughout the temperature range tested. As shown in FIG. 7 when Catalyst Substrate A1 was placed in the sample holder in the conventional direction or in the reverse direction, NH$_3$ removal reached a maximum near 250° C., and exceeded 80% removal between 250-450° C.

The orientation of the catalyst substrate with respect to the flow path of the test gas composition had a significant effect on the NOx conversion. As shown in FIG. 6, when Catalyst Substrate A1 was placed in the sample holder in the conventional direction, NOx conversion reached a maximum at 250° C., with >90% conversion at 250° C. NOx conversions declined somewhat at higher temperatures. However, even at 450° C., NOx conversion still exceeded 60%. In contrast, when Catalyst Substrate C1 was placed in the sample holder in the reversed direction, the NOx conversion performance substantially declined. Furthermore, at temperatures >300° C., the amount of NOx exiting the substrate outlet actually exceeded the amount that was in the test gas composition that was inputted in the system.

The data generated for Catalyst Substrate A1 verifies the zone coating concept with respect to NOx conversion and NH$_3$ conversions. In particular, Catalyst Substrate A1 showed both significant NOx conversion and NH$_3$ removal efficiencies at temperatures of 250 to 450° C., which temperatures are typically encountered in diesel engine exhaust applications.

EXAMPLE 4

Evaluation of Pt/CeO$_2$/Al$_2$O$_3$ Catalyst Composition as An NH$_3$-Destruction Catalyst Evaluations were conducted on catalyst substrates to determine the Pt loading that was optimized for high NH$_3$ removal and low NOx formation ("NOx make"). The compositions varied in the concentration of platinum component present when disposed on the substrate. The trial substrates contained either 0.5, 2.0 or 5.0 g/ft$^3$ of Pt. Pt/CeO$_2$/Al$_2$O$_3$ catalyst compositions were prepared as described for Slurry B3 in Example 1

Samples for evaluation were cored from larger pieces. Each sample was approximately 1 inch in diameter and six inches long. Prior to testing, the sample was trimmed to an approximately square cross section and the number of cells exposed to the gas flow was counted. Knowing the number of open cells, the "honeycomb cell density" (cells per square inch) and the sample length, it was possible to accurately determine the gas flow to achieve a targeted space velocity. The space velocity has units of 1/hours (hr$^{-1}$) and was calculated with the gas flow referred to engineering standard conditions (20° C., 1 atm). To ensure that gas flows only though the sample, a ceramic felt was wrapped around the sample and then the whole assembly is press fit into a metal sample holder.

Test gas compositions used in the evaluations contained 1000 ppm ammonia, supplied as ammonia in nitrogen, 10% oxygen, 5% water vapor and the balance nitrogen. In some tests nitric oxide (NO) was not added, but in all tests NO, NO$_2$ and N$_2$O were measured at the catalyst inlet and outlet. Catalyst performance was reported as the percentage disappearance of ammonia, along with the percentage removal of NO (or percentage make), based on the inlet NO and ammonia concentrations.

Figure 8:
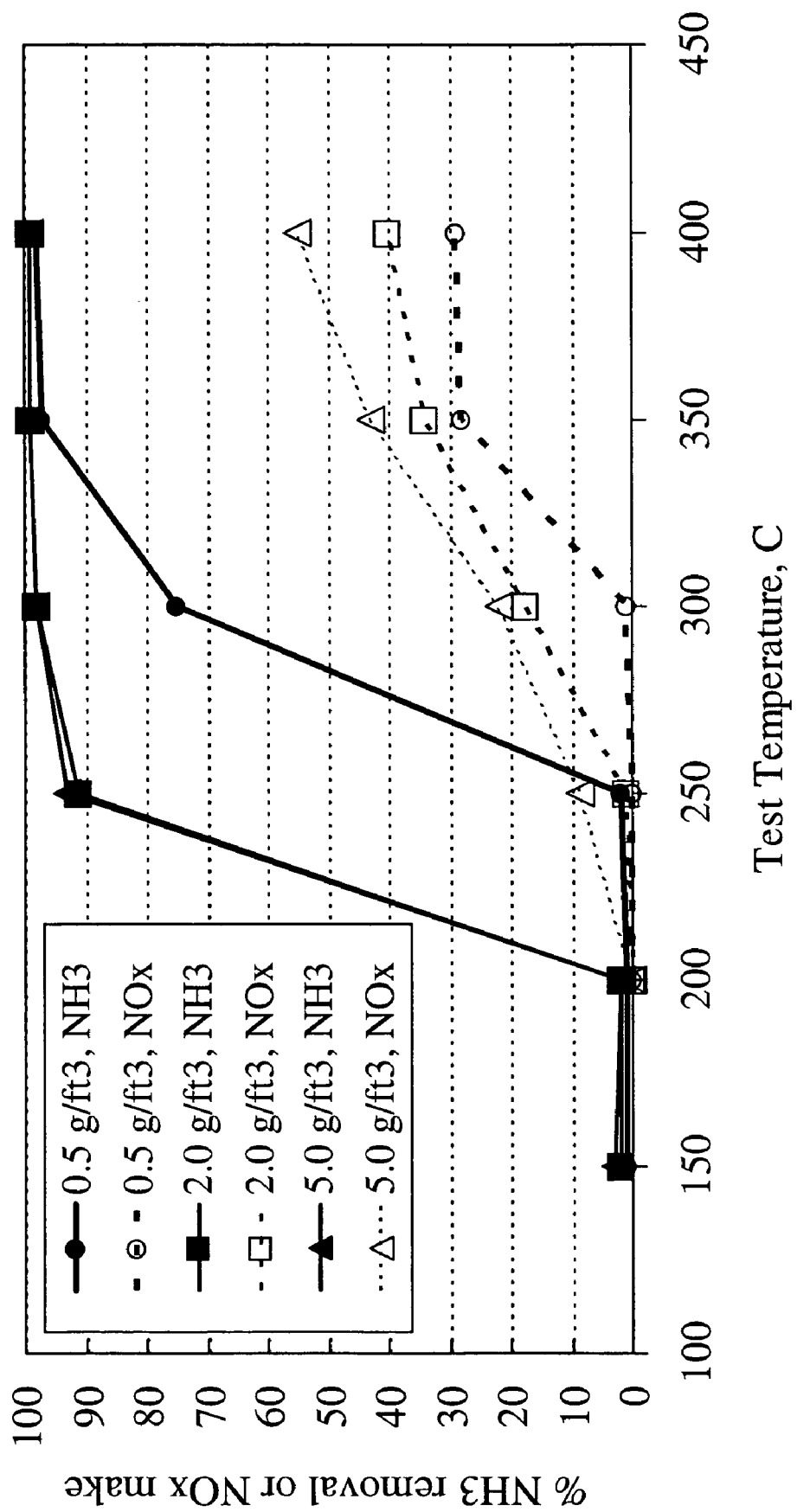
FIG. 8 shows % $NH_3$ removal and % NOx conversion for catalyst substrates coated with a platinum-based $NH_3$ destruction catalyst compositions using a test gas composition with a space velocity of 50,000 $h^{-1}$.
Figure 9:
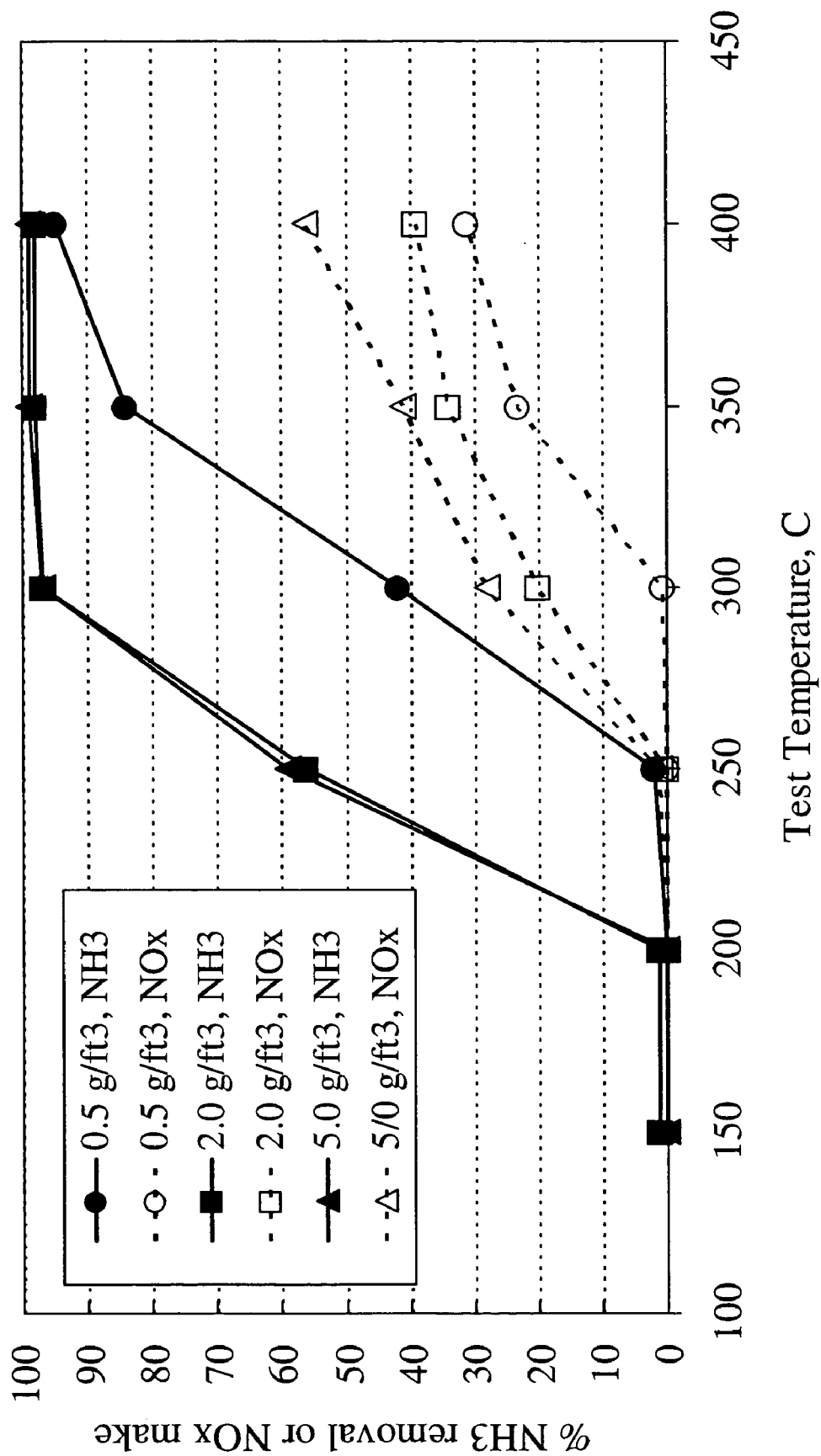
FIG. 9 shows % $NH_3$ removal and % NOx conversion for catalyst substrates coated with a platinum-based $NH_3$ destruction catalyst compositions using a test gas composition with a space velocity of 100,000 $h^{-1}$.

In a first set of trials, catalyst substrates containing 0.5, 2.0 and 5.0 g/ft$^3$ of Pt were evaluated in the test gas stream at inlet temperatures ranging from 150 to 400° C. The test gas was run at a space velocity of 50,000 hr$^{-1}$ (FIG. 8) and 100,000 hr$^{-1}$ (FIG. 9). As shown in FIGS. 8-9, there is a 50 to 60° C. improvement in the ammonia light off temperature by increasing the Pt from 0.5 to 2.0 g/ft$^3$ at 50,000 and 100,000 hr$^{-1}$. However, increasing the Pt loading from 2 to 5 g/ft$^3$ did not further improve the light off. NOx make increased with increasing Pt concentrations and increasing temperature.

Figure 10:
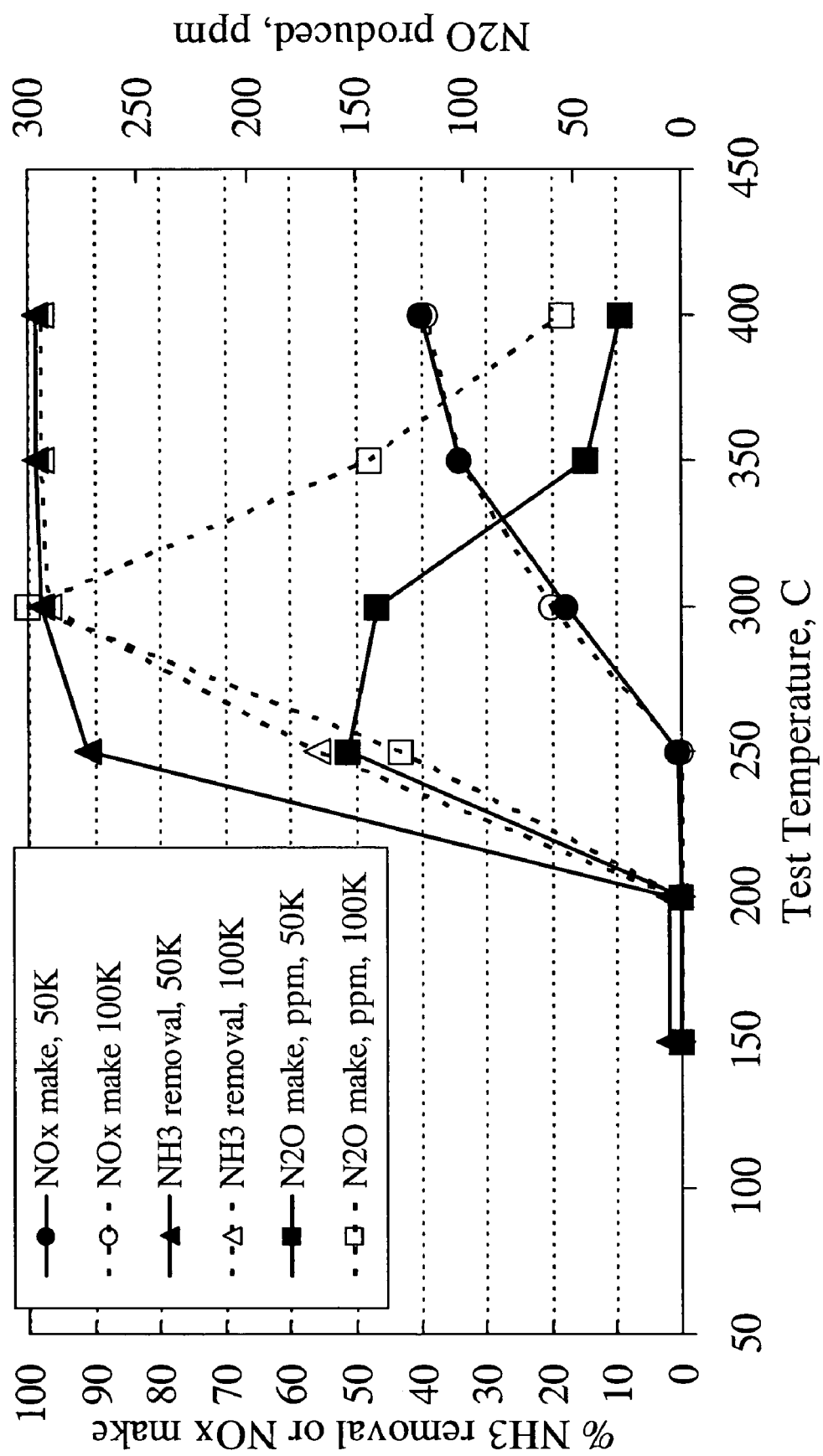
FIG. 10 shows % $NH_3$ removal % NOx make, and % $N_2O$ make for catalyst substrates coated with a $NH_3$ destruction catalyst compositions containing 2 $g/ft^3$ of platinum.

FIG. 10 shows the % NH$_3$ removal, % NOx make and N$_2$O produced (ppm) when the test gas composition was passed through a catalyst substrate containing 2.0 g/ft$^3$ of Pt at 50,000 hr$^{-1}$ and 100,000 hr$^{-1}$. At this Pt concentration, 50% NH$_3$ removal was achieved at 220° C. @ 50,000 hr$^{-1}$, while at 100 K hr$^{-1}$, 50% NH$_3$ removal was achieved at 240° C. The extent of NOx make was almost independent of space velocity. At a space velocity of 50,000 hr$^{-1}$, the NOx make was between 30 to 40%. The amount of N$_2$O formed was greater at 100,000 hr$^{-1}$ than at 50,000 hr$^{-1}$.

In summary, for the NH₃ destruction catalyst, there exists a narrow window of Pt loadings which result in good NH₃ removal and low NOx production.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. An emissions treatment system, comprising:
   a) an injector for periodically metering ammonia or an ammonia precursor into an exhaust stream;
   b) a first substrate comprising a first SCR catalyst composition, downstream of the injector; wherein the first substrate has an inlet end, an outlet end, a length extending between the inlet end to the outlet end, wall elements and a plurality of passages defined by the wall elements;
   wherein the first SCR catalyst composition is disposed on the wall elements from the inlet end toward the outlet end to a length that is less than the substrate's axial length to form an inlet zone;
   an NH₃ destruction catalyst composition comprising a platinum group metal component dispersed on a refractory metal oxide, wherein the NH₃ destruction catalyst composition is disposed on the wall elements from the outlet end toward the inlet end to a length that is less than the substrate's axial length to form an outlet zone; and wherein there is from 0.1 to 10 g/ft³ of platinum group metal component in the outlet zone.

2. The emissions treatment system of claim 1, wherein the platinum group metal component is selected from the group consisting of platinum, palladium, rhodium and iridium components, and combinations thereof.

3. The emissions treatment system of claim 1, wherein there is an uncoated zone of at least 0.25 inches between the inlet and outlet zones.

4. The emissions treatment system of claim 1, wherein the NH₃ destruction catalyst composition further comprises a cerium component.

5. The emissions treatment system of claim 4, wherein the cerium component is in bulk form.

6. The emissions treatment system of claim 1, wherein the first SCR catalyst composition comprises V₂O₅, WO3 and TiO₂.

7. The emissions treatment system of claim 1, wherein the first SCR catalyst composition comprises a zeolite.

8. The emissions treatment system of claim 7, wherein the zeolite comprises a copper-exchanged or iron-exchanged zeolite.

9. The emissions treatment system of claim 1, wherein the first substrate is selected from the group consisting of a honeycomb flow-through substrate and a honeycomb wall flow substrate.

10. The emissions treatment system of claim 9, wherein the first substrate is a honeycomb flow-through substrate.

11. The emissions treatment system of claim 1, further comprising a diesel engine upstream and in fluid communication with the injector.

12. The emissions treatment system of claim 1, further comprising a second substrate interposed and in fluid communication with the injector and the first substrate.

13. The emissions treatment system of claim 12, wherein the second substrate is selected from the group consisting of a honeycomb flow-through substrate, an open-cell foam substrate and a honeycomb wall flow substrate.

14. The emissions treatment system of claim 13, wherein the second substrate is a honeycomb flow-through substrate comprising a second SCR catalyst composition.

15. The emissions treatment system of claim 14, wherein the first and second SCR catalyst compositions are the same.

16. The emissions treatment system of claim 1, wherein there is from 0.1 to less than 5 g/ft³ of platinum group metal component in the outlet zone.

17. The emissions treatment system of claim 16, wherein the platinum component is sulfated.

18. A catalyst article comprising a substrate comprising an inlet catalytic zone and an outlet catalytic zone, wherein said substrate has an inlet end, an outlet end, a length extending between the inlet end to the outlet end, wall elements and a plurality of passages defined by the wall elements;
   wherein an SCR catalyst composition is disposed on the wall elements from the inlet end toward the outlet end to a length that is less than the substrate's axial length to form the inlet catalytic zone; and
   an NH₃ destruction catalyst composition comprising a platinum group metal component dispersed on a refractory metal oxide, which is disposed on the wall elements from the outlet end toward the inlet end to a length that is less than the substrate's axial length to form the outlet catalytic zone; and wherein the outlet catalytic zone comprises from 0.1 to 10 g/ft³ of platinum group metal component in the outlet catalytic zone.

19. The article of claim 18, wherein the outlet catalytic zone comprises from 0.5 to 5 g/ft³ of platinum group metal component.

20. The article of claim 18, wherein the platinum group metal component is selected from the group consisting of platinum, palladium, rhodium and iridium components, and combinations thereof.

21. The article of claim 18, comprising an uncoated zone of at least 0.25 inches between the inlet and outlet zones.

22. The article of claim 18, wherein the NH₃ destruction catalyst composition further comprises a cerium component.

23. The article of claim 22, wherein the cerium component is in bulk form.

24. The article of claim 18, wherein the first SCR catalyst composition comprises V₂O₅, WO3 and TiO₂.

25. The article of claim 18, wherein the first SCR catalyst composition comprises a zeolite.

26. The article of claim 25, wherein the zeolite comprises a copper-exchanged or iron-exchanged zeolite.

27. The article of claim 18, wherein the substrate is selected from the group consisting of a honeycomb flow-through substrate and a honeycomb wall flow substrate.

28. The article of claim 27, wherein the substrate is a honeycomb flow-through substrate.

29. The article of claim 18, wherein the platinum component is sulfated.

* * * * *